(12) United States Patent
Chen et al.

(10) Patent No.: US 11,017,272 B2
(45) Date of Patent: May 25, 2021

(54) RANDOM AND ACTIVE LEARNING FOR CLASSIFIER TRAINING

(71) Applicant: Facebook, Inc., Menlo Park, CA (US)

(72) Inventors: Jianfu Chen, Mountain View, CA (US); Timothy Jacoby, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 847 days.

(21) Appl. No.: 15/827,294

(22) Filed: Nov. 30, 2017

(65) Prior Publication Data

US 2019/0164017 A1 May 30, 2019

(51) Int. Cl.
| | |
|---|---|
| *G06N 20/00* | (2019.01) |
| *G06K 9/62* | (2006.01) |
| *G06N 3/08* | (2006.01) |
| *G06F 16/38* | (2019.01) |

(52) U.S. Cl.
CPC ........... *G06K 9/6267* (2013.01); *G06F 16/38* (2019.01); *G06K 9/623* (2013.01); *G06K 9/6227* (2013.01); *G06K 9/6259* (2013.01); *G06N 3/08* (2013.01); *G06N 20/00* (2019.01)

(58) Field of Classification Search
None
See application file for complete search history.

(56) References Cited

PUBLICATIONS

Diba, et, al., Weakly Supervised Cascaded Convolutional Networks, CVPR, 2017, pp. 914-922 (Year: 2017).*
Lee, et al., Incremental Cluster Evolution Tracking from Highly Dynamic Network Data, ICDE 2014, Volume: 1, 2014, pp. 3-14 (Year : 2014).*

* cited by examiner

*Primary Examiner* — Wilbert L Starks
(74) *Attorney, Agent, or Firm* — Fenwick & West LLP

(57) ABSTRACT

An online system actively and randomly selects content items to be labeled for training a classifier. An online system receives content items from client devices of users and selects sets of the content items to be labeled by human labelers. The randomly selected content items are selected at random from the received content items, and the actively selected content items are selected based on the classifier's confidence in accurately predicting the classification of the content items. The online system may use a histogram of content items to actively select content items. The online system assigns the content items to bins of the histogram based on priority scores and selects content items with priority scores of the highest percentile. The online system provides the selected content items to human labelers for labeling. The labeled content items are then used for training the classifier.

20 Claims, 4 Drawing Sheets

RANDOM AND ACTIVE LEARNING FOR CLASSIFIER TRAINING

BACKGROUND

An online system can use a machine-learned classification model to identify classes of content items to be presented to users. To train the classification model, the online system can transmit new content items to human labelers that label the content items with a class. The online system can then use the labeled content items to train the classification model to classify future content items. Since human labelers are costly and relatively slow, online systems typically only have humans manually label a subset of the content items presented by the online system. When a subset of the items is selected for labeling, the particular content items that are selected for labeling (and subsequent model training) can affect the model's efficacy and predictive accuracy (e.g., precision and recall). Since the number of content items selected for labeling is typically limited, selection of one content item for the subset typically results in exclusion of other content items. The selected subset may thus bias the training towards those content items that were selected for labeling, and poor selection may limit the trained model's ability to learn types of content items not included in the training set, and to over-learn types of content items that were included or are readily distinguishable by the model.

SUMMARY

An online system selects content items for manual labeling based on a classification model's confidence in labeling the content items. The online system receives content items from users of the online system and classifies the content items using the classification model. The classification model determines a confidence in the classification of each content item and selects a set of the content items to be presented for labeling by human labelers based on the classification confidence. This non-random selection of content items for labeling is termed "active selection." The online system selects new content items for manual labeling as they are created by users of the online system. The labeled content items are used to improve the classification model over time.

In some embodiments the online system combines actively-selected content items (active selection) with randomly-selected content items (random selection) in selecting additional content items for labeling. When the content items are selected from a stream of items added to the online system (e.g., online systems receiving new content items from users), the stream of content items may change in composition over time. Since the model is trained with previously-selected content items, the model's confidence may not accurately capture changes in the composition of the additional content items or may otherwise imprecisely predict which content items will more effectively improve the model's prediction. The model's confidence may over or under select a certain type of content item, and the model itself may not effectively be able to identify which content items it cannot effectively predict. By combining the active selection with a random selection, the active selection may influence and improve model training, while including some randomly-selected items ensures that the subsequent items does not overly rely on the model's current prediction itself.

In some embodiments, the online system actively select content items for labeling by generating priority scores for the content items. The priority score of a content item represents the content item's priority for being labeled to train the classification model. The priority scores may be generated based on the classification model's confidence in classifying the content items, the type of the content item, or content associated with the content item. The online system may use a threshold for the priority score to select content items for labeling. Alternatively, the online system may assign the content items to bins of a histogram based on priority scores for the content items. The generated priority scores may be limited to a set of possible priority scores, and the histogram may include a bin for each possible priority score. As content items are stored in the histogram, the content items are assigned to bins that correspond to the priority scores of the content items. To actively select a content item for labeling, the online system uses the histogram to determine whether the content item is in some threshold top percentile of the content items stored by the histogram. For example, the online system may use the histogram to determine whether the content item is in the top 10% of the content items stored by the histogram. Since the histogram may store a set number of the most recently received content items, the online system can thus actively select content items for labeling in constant time, thereby improving the efficiency of the online system's training process, especially when considering a large number of the most recently received content items.

BRIEF DESCRIPTION OF THE DRAWINGS

Figure (FIG. 1 illustrates an example system environment and system architecture for an online system, in accordance with some embodiments.

DETAILED DESCRIPTION

Figure 1:
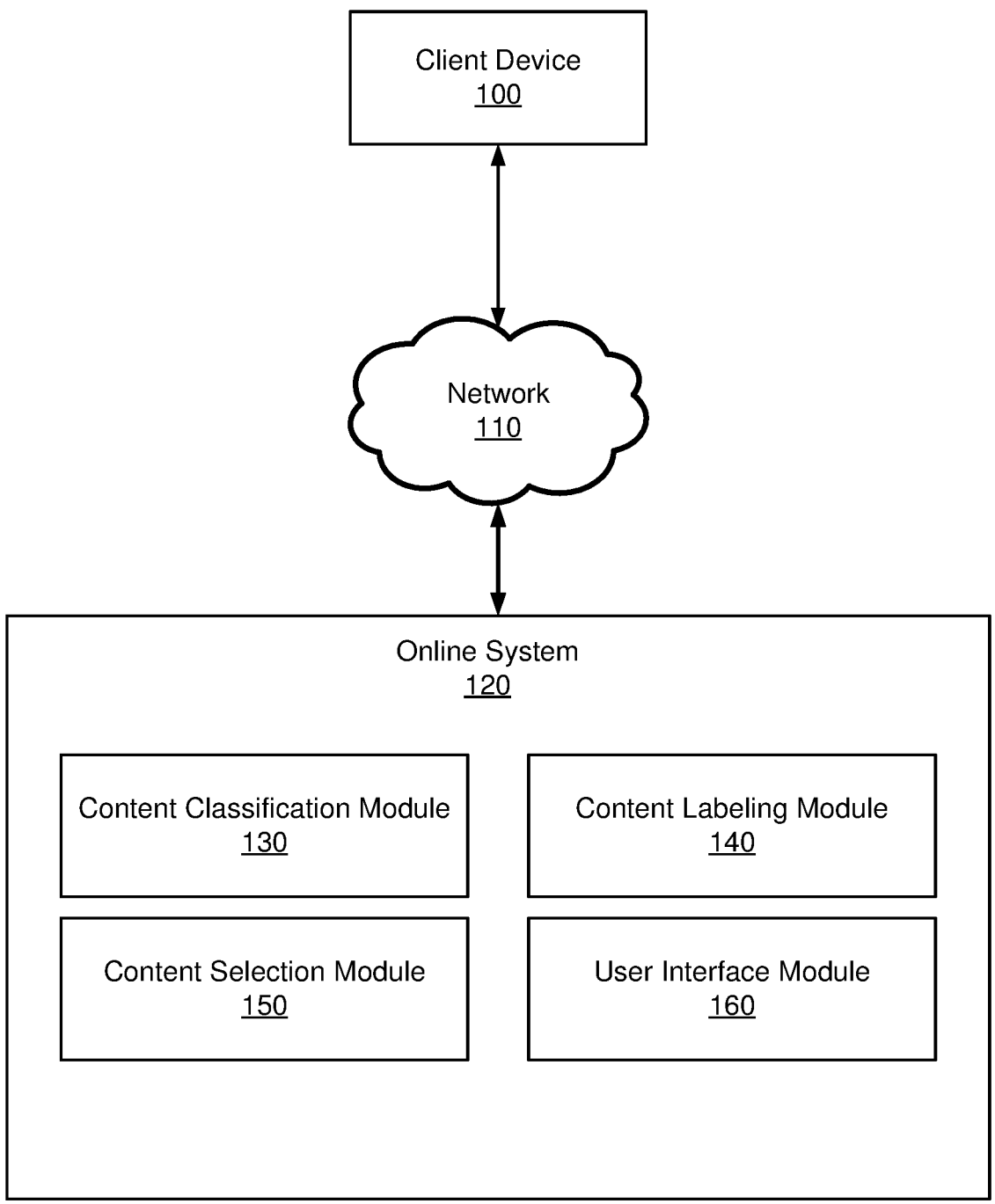

FIG. 1 illustrates an example system environment for an online system 120, in accordance with some embodiments. The system environment illustrated in FIG. 1 includes a client device 100, a network 110, and an online system 120. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

A user can interact with the online system 120 through a client device 100. The client device 100 can be a personal or mobile computing device, such as a smartphone, a tablet, a laptop computer, or desktop computer. In some embodiments, the client device 100 executes a client application that uses an application programming interface (API) to communicate with the online system 120 through the network 110. A user can use the client device 100 to generate, transmit, and receive content items. Content items are structured pieces of content generated by users of the online system. For example, content items can include text, photos, videos, events, groups of users, online applications, or web pages. Content items can also include a type of the content item, an identifier for the user who generated the content item, or identifiers of other content items associated with the content item.

The client device 100 can receive content from the user to generate a content item. The client device 100 transmits the content item to the online system 120 to be stored or transmitted to other users of the online system 120. The client device 100 can receive content items from the online system 120. The received content items can include content items generated by the user operating the client device 100 or by other users of the online system 120.

The client device 100 communicates with the online system 120 via the network 110, which may comprise any combination of local area and wide area networks employing wired or wireless communication links. In some embodiments, the network 110 uses standard communications technologies and protocols. For example, the network 110 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 110 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 110 may be represented using any format, such as hypertext markup language (HTML) or extensible markup language (XML). In some embodiments, all or some of the communication links of the network 110 may be encrypted.

FIG. 1 also illustrates an example system architecture of an online system 120, in accordance with some embodiments. The online system 120 illustrated in FIG. 1 includes a content classification module 130, a content labeling module 140, a content selection module 150, and a user interface module. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

The content classification module 130 classifies content items received by the online system 120. The content classification module 130 may classify content items to describe the content contained by the content item. For example, the content classification module 130 may classify photo content items based on objects contained in the photos or may classify text content items based on the subject of the text. The classification module 130 also may classify content items based on whether the content item should be further processed by the online system (e.g., if the content item should be reviewed for policy violation). The content classification module 130 can classify content items based on the content contained by the content items, the types of the content item, the user who generated the content item, or identifiers of other content items associated with the content item.

The content classification module 130 uses a machine-learned classification model to classify content items. The classification model includes one or more machine-learned models that are trained to classify content items. The machine learned models can be a decision tree, a support vector machine, or a neural network. The classification model is trained based on content items labeled by the content labeling module 140. The content labeling module 140 labels content items received from the client device 100. The content labeling module 140 can label content items by presenting the content items to human labelers for manual labeling. In some embodiments, the content labeling module 140 uses a more accurate, though potentially less efficient, machine-learned model than the classification model to label content items. The content labeling module 140 can include a queue of content items to be labeled by the content labeling module 140. In some embodiments, the queue has a maximum number of content items to be enqueued and a new content item can only be added to the queue when the content labeling module 140 takes a content item out of the queue to be labeled. Alternatively, the content labeling module 140 notifies the content selection module 150 to provide the content labeling module 140 with a new content item when the content labeling module 140 has capacity to label a new content item.

The content selection module 150 selects content items to be labeled by the content labeling module 140. The content selection module 150 receives content items from client devices 100 operated by users of the online system 120 and identifies content items to be labeled. The identified content items can include two sets of content items: randomly selected content items and actively selected content items. The set of randomly selected content items contains content items that are randomly selected by the content selection module 150 from the content items received from the client devices 100. The content selection module 150 can randomly select some proportion of the content items received from the client devices 100 based on how many content items can be labeled by the content labeling module 140. In some embodiments, the content labeling module 140 instructs the content selection module 150 to select a new content item to be labeled and the content selection module 150 either actively or randomly selects a content item to be labeled by the content labeling module 140. The content selection module 150 may alternate between randomly and actively selecting content items for labeling or may randomly or actively select content items such that a predetermined proportion of randomly selected content items and actively selected content items are labeled.

The content selection module 150 generates the actively selected set of content items by selecting content items received from the client devices 100 based on the classification model's certainty in correctly classifying the content item. As the classification model classifies content items, the classification model can determine a confidence score that the content item's predicted classification is accurate. The content selection module 150 uses the generated confidence score to determine whether the content item should be actively selected to be labeled by the content labeling module 140. In some embodiments, the content selection module 150 selects content items with confidence scores that are less than a threshold. Alternatively, the content selection module 150 may select content items with confidence scores that are below a confidence score of some percentile.

In embodiments where the classification model is a binary classifier (i.e., the classification model classifies content items as one of two classes), the content selection module 150 may use the classification model's confidence in a classification as the confidence score. For example, the classifier may designate a content item as 60% likely to be within the trained class, designating a 60% confidence in that classification. In embodiments where the classification model is a multi-class classifier (i.e., the classification model classifies content items as one of three or more classes), the content selection module 150 can use the spread or "entropy" of confidence values generated for each class that the classification model can identify to determine the confidence score of a content item's classification. The set of confidence values generated by a multi-class classification model has a high spread when the confidence value of the content item's classification is similar to many of the confidence values for other classifications. A set of confidence values has a low spread when the confidence value of the content item's classification is significantly greater than most or all of the other confidence values. If a set of confidence values for a content item has a high spread, then the classification model has a low confidence in the content item's classification and the confidence score for the content item would be low. If a set of confidence values for a content item has a low spread, then the classification has a high confidence in the content item's classification and the confidence score for the content item would be high.

In some embodiments, the content selection module 150 selects all content items with confidence scores below a threshold for labeling by the content labeling module 140. However, the online system 120 may receive too many content items from client devices 100 that not every content item with a low confidence score (e.g., below the threshold value) can be labeled. In these cases, the content selection module 150 may consider only a fixed number of the most recently received content items, and prioritizes the labeling of the most recently received content items. To prioritize the content items, the content selection module 150 can generate a priority score for each content item that represents the value to the online system 120 of labeling the content item. A content item may be assigned a high priority score if the confidence score for the content item is low or if the predicted classification of the content item is important for the online system 120 to accurately classify. A priority score for a content item may be generated based on the confidence score for the content item, the predicted classification of the content item, the type of the content item, the user associated with the content item, or content items associated with the content item.

Figure 2:
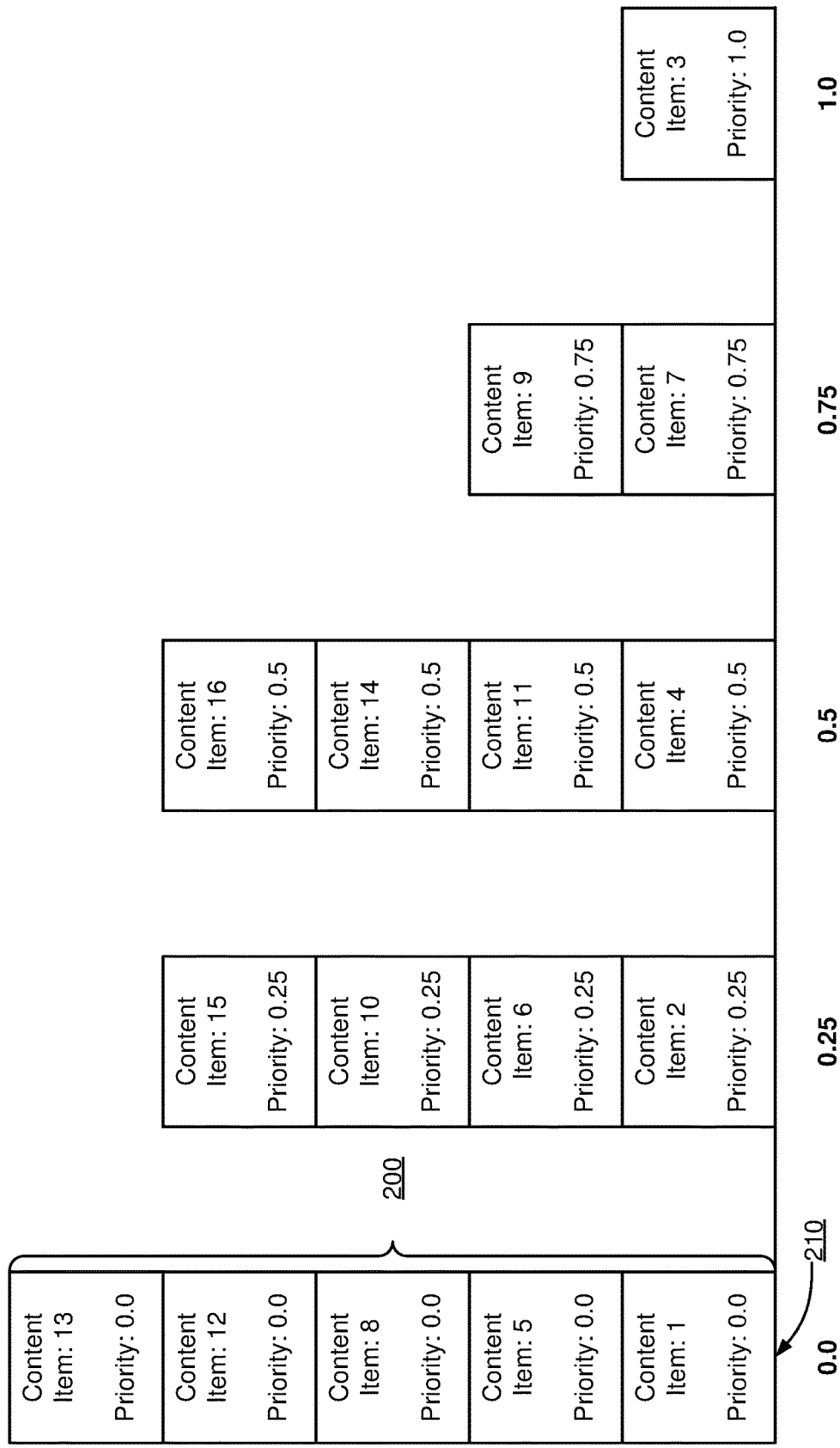
FIG. 2 illustrates an example histogram, in accordance with some embodiments.

The content selection module 150 may use a threshold value for the priority score to select content items for labeling. If the priority score for a content item exceeds the threshold value, the content selection module 150 selects the content item associated with the priority score for labeling. Alternatively, in some embodiments, the content selection module 150 uses a histogram to actively select content items. FIG. 2 illustrates an example histogram, in accordance with some embodiments. The histogram stores a set of the most recently received content items 200. For example, the histogram illustrated in FIG. 2 stores the 16 most recently received content items 200, however any number of content items may be stored. As each content item 200 is received, the content selection module 150 generates a priority score for each content item and determines whether the priority score of the new content item is above some threshold priority score that represents a priority score of a particular percentile for the set of most recently received content items stored by the histogram. For example, the threshold priority score may represent the priority score of the top 1%, 5%, 10%, 20%, or 30% of priority scores associated with content items stored by the histogram. If the new content item's priority score meets or exceeds the threshold priority score, the content selection module 150 selects the new content item for labeling.

After scoring the new content item, the content selection module 150 assigns the content item to a bin 210 of the histogram based on the priority score of the new content item. The histogram has a bin 210 for each possible priority score that a content item can receive. For example, if the priority scores range from 0.001 to 1.000, with a resolution of 0.001, the histogram includes 1,000 bins, one for each possible priority score. The example histogram illustrated in FIG. 2 has a range of priority score of 0.0 to 1.0, with a resolution of 0.25. The content selection module 150 assigns the new content item to the bin of the histogram that that is associated with the priority score of the content item. The content selection module 150 also removes the oldest content item in the histogram from the histogram so that the number of the most recently received content items stored by the histogram stays the same after the new content item is added.

When a new content item is added, the content selection module 150 adjusts the threshold priority score accordingly. The content selection module 150 can use the numbers of content item in each bin of the histogram and the total number of content items stored by the histogram to efficiently adjust the threshold priority score in constant time. Thus, the content selection module 150 can efficiently identify content items with priority scores that exceed a threshold percentile of the priority scores of a number of most recently received content items.

The user interface module 160 links the online system 120 to the client device 100. The user interface module 160 can serves web page, as well as other web-related content, such as JAVA®, FLASH®, XML and so forth. The user interface module 160 may receive and route messages between the online system 120 and the client device 100, for example, instant messages, queued messages (e.g., email), text messages, short message service (SMS) messages, or messages sent using any other suitable messaging technique. A user may send a request to the user interface module 160 to upload content (e.g., images or videos) for content items that are stored in the online system 120. Additionally, the user interface module 160 may provide application programming interface (API) functionality to send data directly to native client device operating systems, such as IOS®, ANDROID™, WEBOS® or RIM®. The user interface module 160 transmits content items to the client device 100 for presentation to the user. The user interface module 160 uses the classifications of content items generated by the content classification module 130 to determine which content items to present to the user. For example, the user interface module 160 may select content items with classifications with which the user is more likely to interact.

Figure 3:
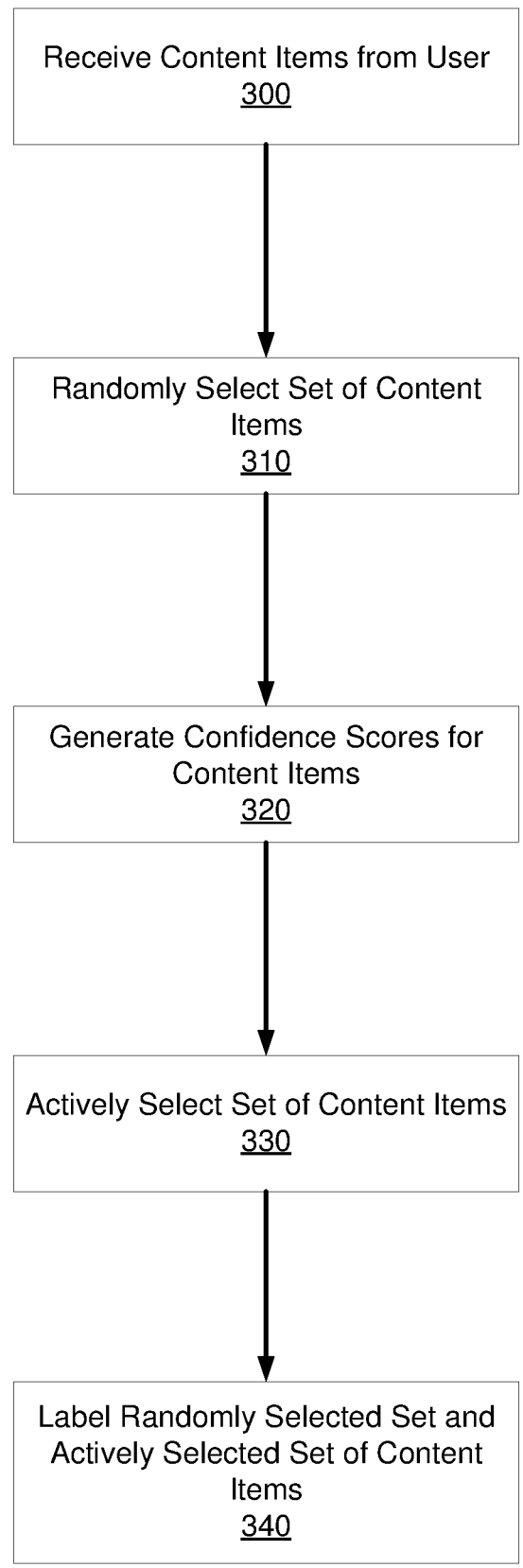
FIG. 3 is a flowchart for a method of selecting content items for labeling, in accordance with some embodiments.

FIG. 3 is a flowchart for a method of selecting content items for labeling, in accordance with some embodiments. Alternative embodiments may include more, fewer, or different steps from those illustrated in FIG. 3, and the steps may be performed in a different order from that illustrated in FIG. 3. Additionally, each of these steps may be performed automatically by the online system without human intervention.

The online system receives 300 content items from one or more client devices operated by users of the online system. The content items may be generated by the client devices based on content uploaded by the user to the online system. The online system randomly selects 310 a set of content items of the received content items. The randomly selected set can include a predetermined proportion of the received content items. The online system generates 320 confidence scores for the content items received from the client devices. The online system may or may not generate 320 confidence scores for content items that are part of the randomly selected set of content items. The online system actively selects 330 a set of content items of the received content items. The actively selected set of content items may or may not overlap with the randomly selected set of content items. The online system labels 340 the randomly selected set of content items and the actively selected set of content items and uses the labeled content items to train a classification model for classifying content items.

Figure 4:
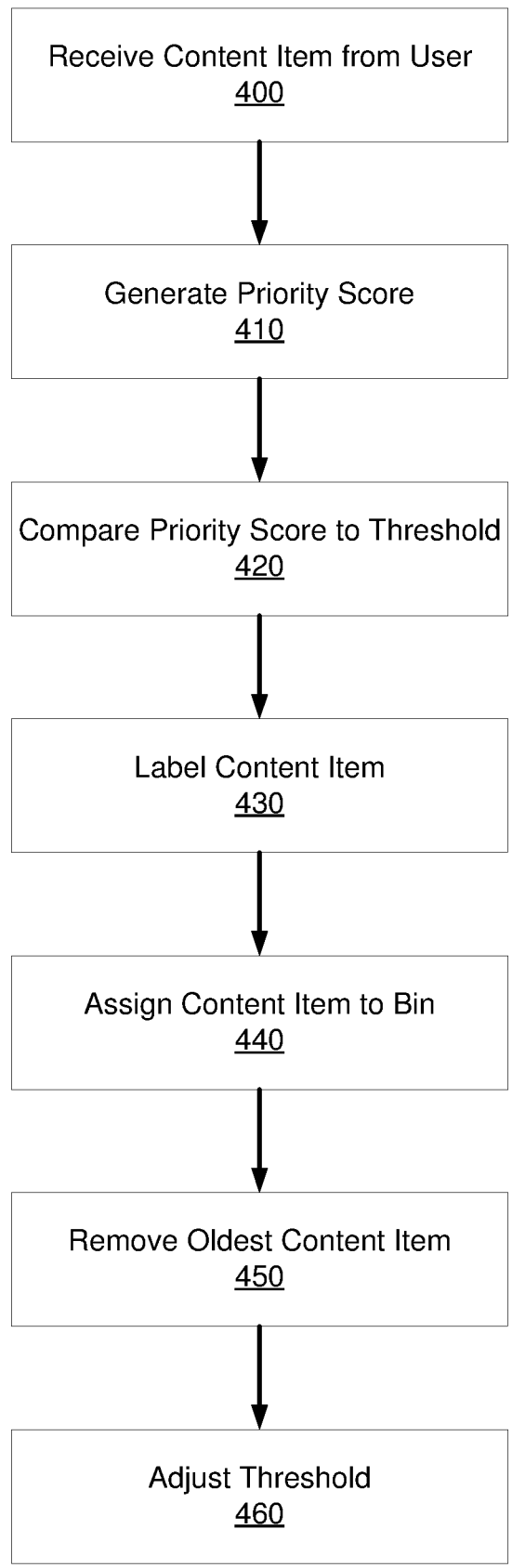
FIG. 4 is a flowchart for a method of actively selecting content items for labeling based on a histogram, in accordance with some embodiments.

FIG. 4 is a flowchart for a method of actively selecting content items for labeling based on a histogram, in accordance with some embodiments. Alternative embodiments may include more, fewer, or different steps from those illustrated in FIG. 4, and the steps may be performed in a different order from that illustrated in FIG. 4. Additionally, each of these steps may be performed automatically by the online system without human intervention.

The online system receives 400 a content item from a client device operated by a user of the online system and generates 410 a priority score for the content item. The online system compares 420 the priority score of the content item to a threshold score value that represents a priority value of a particular percentile of a set of most recently received content items. If the priority score of the content item exceeds the threshold priority score, the online system labels 430 the content item and uses the labeled content item to train a classification model that the online system uses to classify content items.

The online system assigns 440 the content item to a bin of a histogram based on the priority score of the content item and removes 450 the oldest content item stored by the histogram. The online system adjusts 460 the threshold priority score based on the new set of content items stored by the histogram.

Additional Considerations

The foregoing description of the embodiments has been presented for the purpose of illustration; it is not intended to be exhaustive or to limit the patent rights to the precise pages disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising one or more computer-readable media containing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving a plurality of content items from one or more client devices operated by one or more users of an online system;
   randomly selecting a first set of the plurality of content items;
   actively selecting a second set of the plurality of content items by:
      applying a classification model to each content item of a subset of the plurality of content items to determine a classification of each content item,
      determining a confidence score of the trained model for the classification for each content item of the subset of the plurality of content items, each generated confidence score representing a confidence of the classification model in the classification, and
      selecting a second set of the plurality of content items based on the confidence scores of the subset of content items;
   providing the first set of content items and the second set of content items to an authority for labeling;
   receiving labels from the authority for the first set of content items and the second set of content items; and
   training the classification model with training data including the first set of content items, the second set of content items, and the received labels.

2. The method of claim 1, wherein randomly selecting the first set of content items comprises: randomly selecting a predetermined proportion of the plurality of content items.

3. The method of claim 1, wherein the classification model is a binary classifier, and wherein determining a confidence score for each content item of the subset of content items comprises:

predicting a classification of the content item using the classification model; and
generating the confidence score based on a confidence of the predicted classification.

4. The method of claim 1, wherein the classification model is a multi-class classifier, and wherein determining a confidence score for each content item of the subset of content items comprises:
predicting a classification of the content item using the classification model; and
generating the confidence score based on a spread of confidence values associated with the content item.

5. The method of claim 1, wherein the confidence score for each content item is determined based on content contained by the content item, a type of the content item, a user who generated the content item, or identifiers of other content items associated with the content item.

6. The method of claim 1, wherein the first set of content items and the second set of content items do not overlap.

7. The method of claim 1, wherein to the authority comprises one or more human labelers.

8. A method comprising:
receiving a content item from a client device operated by a user of an online system;
generating a priority score for the content item, the priority score representing a priority for labeling the content item for training a classification model;
comparing the priority score of the content item to a threshold priority score;
responsive to the priority score exceeding the threshold priority score, providing the content item to an authority for labeling;
receiving a label from the authority for the content item;
training the classification model with training data including the first set of content items, the second set of content items, and the received labels;
assigning the content item to a bin of a histogram based on the priority score of the content item, the histogram comprising a plurality of bins; and
adjusting the threshold priority score based on a set of content items stored in the plurality of bins of the histogram, the set of content items comprising the content item.

9. The method of claim 8, wherein each priority score is generated based on a confidence score associated with a content item of the plurality of content items, the confidence score representing a confidence of the classification model in classifying the content item.

10. The method of claim 8, wherein the priority score is generated based on content contained by the content item, a type of the content item, a user who generated the content item, or identifiers of other content items associated with the content item.

11. The method of claim 8, wherein each bin of the plurality of bins is associated with a possible priority score of a set of possible priority scores, and wherein the content item is assigned to a bin of the plurality of bins associated with the priority score of the content item.

12. The method of claim 8, further comprising:
identifying a content item of the set of content items, the identified content item having an earliest time at which the identified content item was received by the online system; and
removing the identified content item from the set of content items stored by the histogram.

13. The method of claim 12, wherein the threshold priority score is adjusted based on the set of content items stored by the histogram after the identified content item is removed from the set of content items.

14. The method of claim 8, wherein labeling the authority comprises a human labeler.

15. The method of claim 8, wherein the threshold priority score is a priority score of a particular percentile of priority scores of the set of content items stored by the histogram.

16. A non-transitory, computer-readable medium comprising instructions that, when executed by a processor, cause the processor to:
receive a plurality of content items from one or more client devices operated by one or more users of an online system;
randomly select a first set of the plurality of content items;
actively select a second set of the plurality of content items by:
applying a classification model to each content item of a subset of the plurality of content items to determine a classification of each content item,
determining a confidence score of the trained model for the classification for each content item of the subset of the plurality of content items, each generated confidence score representing a confidence of the classification model in the classification, and
selecting a second set of the plurality of content items based on the confidence scores of the subset of content items;
provide the first set of content items and the second set of content items to an authority for labeling;
receive labels from the authority for the first set of content items and the second set of content items; and
train the classification model with training data including the first set of content items, the second set of content items, and the received labels.

17. The computer-readable of claim 16, wherein to the authority comprises one or more human labelers.

18. A non-transitory, computer-readable medium comprising instructions that, when executed by a processor, cause the processor to:
receive a content item from a client device operated by a user of an online system;
generate a priority score for the content item, the priority score representing a priority for labeling the content item for training a classification model;
compare the priority score of the content item to a threshold priority score;
responsive to the priority score exceeding the threshold priority score, provide the content item to an authority for labeling;
receive a label from the authority for the content item;
train the classification model with training data including the first set of content items, the second set of content items, and the received labels;
assign the content item to a bin of a histogram based on the priority score of the content item, the histogram comprising a plurality of bins; and
adjust the threshold priority score based on a set of content items stored in the plurality of bins of the histogram, the set of content items comprising the content item.

19. The computer-readable medium of claim 18, wherein each bin of the plurality of bins is associated with a possible priority score of a set of possible priority scores, and wherein the content item is assigned to a bin of the plurality of bins associated with the priority score of the content item.

20. The computer-readable medium of claim 18, wherein the threshold priority score is a priority score of a particular percentile of priority scores of the set of content items stored by the histogram.

\* \* \* \* \*

UNITED STATES PATENT AND TRADEMARK OFFICE
CERTIFICATE OF CORRECTION

PATENT NO. : 11,017,272 B2
APPLICATION NO. : 15/827294
DATED : May 25, 2021
INVENTOR(S) : Jianfu Chen et al.

Page 1 of 1

It is certified that error appears in the above-identified patent and that said Letters Patent is hereby corrected as shown below:

In the Claims

Column 10, Line 35, Claim 17, delete "computer-readable of" and insert -- computer-readable medium of --.

Signed and Sealed this
Eighteenth Day of January, 2022

Drew Hirshfeld
*Performing the Functions and Duties of the
Under Secretary of Commerce for Intellectual Property and
Director of the United States Patent and Trademark Office*